T. J. PRICE.
Skimming Apparatus for Sugar Pans.
No. 41,941. Patented March 15, 1864.
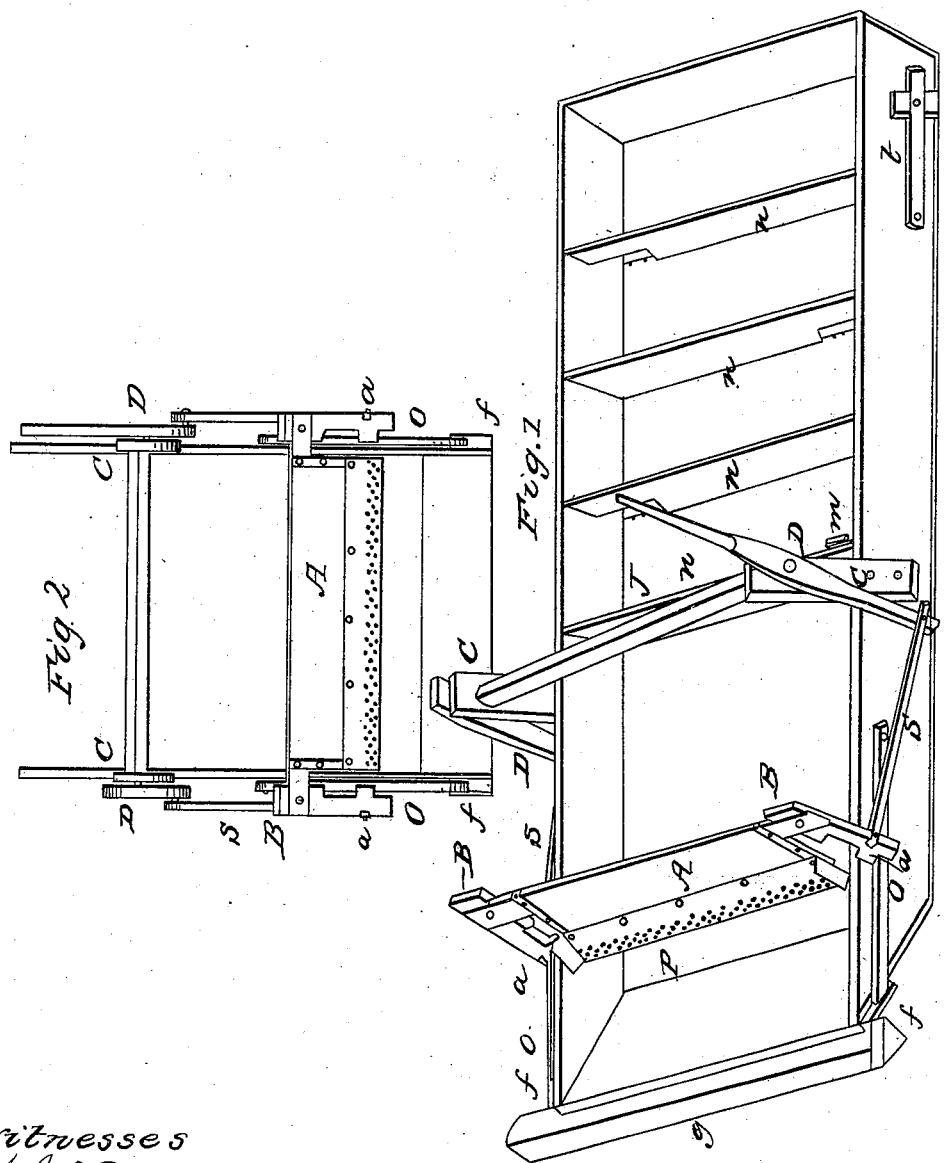

UNITED STATES PATENT OFFICE.

THOMAS J. PRICE, OF INDUSTRY, ILLINOIS.

IMPROVED SKIMMING APPARATUS FOR SUGAR-PANS.

Specification forming part of Letters Patent No. 41,941, dated March 15, 1864.

*To all whom it may concern:*

Be it known that I, THOMAS J. PRICE, of Industry, in the county of McDonough and States of Illinois, have invented a new and Improved Skimming Apparatus for Sugar-Evaporators; and I do hereby declare that the following is a full and exact description thereof, reference being had to the accompanying drawings, making a part of this specification, in which—

Figure 1 is a perspective view of the evaporator with the skimming apparatus attached thereto. Fig. 2 is a sectional view of the same.

The nature of my invention consists in constructing a skimming apparatus for sugar-evaporators so that the skimmer, in its backward movement, is elevated above the boiling juice until it gets in the rear of the scum, then drops down into the juice, and in its forward movement catches all the scum and scrapes it up the inclined end, making a deposit in the gutter.

To enable others skilled in the art to make and use my invention, I will proceed to describe its construction and operation.

A represents the skimmer, the lower edge of which is perforated, to allow the juice to strain through. At each end of the skimmer A are attached head-blocks B B. Near the lower ends of these head-blocks are inward projections, $a\,a$, which form bearings on the rods $o\,o$. The rods $o\,o$ are loosely pivoted at the back end, the front end resting on the front piece, $ff$. The rock-shaft J is supported by the uprights C C, and has levers D D attached to each end, one of sufficient length to form a handle. At the lower ends of the levers D D are pivoted the rods $s\,s$, the front ends of which are attached to the head-blocks B B.

The operation is as follows: The saccharine juice is let into the defecating-apartment at P, and when it commences to boil the ebullition will be the greatest at the first partition, which will cause all the scum and feculent matter to flow forward and deposit on the inclined end, and when a sufficient quantity is deposited the operator takes hold of the long lever D and draws the skimmer A back until it drops off the end of the rods $o\,o$, which lets the perforated part into the boiling juice. Then the skimmer is run forward to and up the inclined end, depositing the scum in the gutter $g$. The skimmer is then drawn back to its shown position until another deposit of scum is ready to be removed. You will observe that in the skimmer's forward movement the rods $o\,o$ are above the inward projections, $a\,a$, on the head-blocks B B until the skimmer reaches the gutter, then they drop back to their shown position, forming slides to elevate the skimmer in its backward movement. When the juice is sufficiently defecated and scummed, the gate $m$ is raised, and the juice is allowed to flow into the rear of the evaporator, which is divided by cross-partitions $n\,n\,n\,n$, which causes the juice to flow in a transverse channel, and when it is concentrated to the proper degree for sirup or sugar it is let out at the gate $t$.

What I claim as new, and desire to secure by Letters Patent, is—

1. The skimmer A, in combination with the head-blocks B B and rods $o\,o$, substantially as and for the purpose set forth.

2. The rock-shaft J, and levers D D, and rods $s\,s$, in combination with the head-blocks B B and rods $o\,o$, substantially as shown and described, for the purpose specified.

3. A skimming apparatus which elevates the skimmer above the boiling juice in its rearward movement until it gets in the rear of the deposit of scum, then drops into the boiling juices, and in its forward movement catches the scum and scrapes it up the inclined end, depositing it in the gutter $g$, as shown, and for the purpose set forth.

THOMAS J. PRICE.

Witnesses:
DAVID DOWNEN,
ISAAC CHANDLER.